US005745743A

United States Patent [19]

Kakishita

[11] Patent Number: 5,745,743

[45] Date of Patent: Apr. 28, 1998

[54] DIGITAL SIGNAL PROCESSOR INTEGRALLY INCORPORATING A COEFFICIENT INTERPOLATOR STRUCTURED ON A HARDWARE BASIS

[75] Inventor: Masahiro Kakishita, Hamamatsu, Japan

[73] Assignee: Yamaha Corporation, Japan

[21] Appl. No.: 747,434

[22] Filed: Nov. 20, 1996

Related U.S. Application Data

[63] Continuation of Ser. No. 908,223, Jul. 2, 1992, abandoned.

[30] Foreign Application Priority Data

Jul. 4, 1991 [JP] Japan ............ 3-189472

[51] Int. Cl.[6] ............ G10H 1/12; G06F 9/00

[52] U.S. Cl. ............ 395/561; 395/800; 84/605; 84/659; 84/662

[58] Field of Search ............ 395/561, 595, 395/800, 2.67, 2.74; 84/605, 659, 662

[56] References Cited

U.S. PATENT DOCUMENTS

| | | | |
|---|---|---|---|
| 4,736,663 | 4/1988 | Wawrzynek et al. | 84/1.26 |
| 4,907,484 | 3/1990 | Suzuki et al. | 84/661 |
| 4,961,363 | 10/1990 | Mizuno et al. | 84/615 |
| 4,984,276 | 1/1991 | Smith | 381/63 |
| 5,033,352 | 7/1991 | Kellogg et al. | 84/658 |
| 5,140,541 | 8/1992 | Sakata et al. | 364/724.19 |
| 5,149,902 | 9/1992 | Washiyama | 84/622 |
| 5,173,567 | 12/1992 | Fujita | 84/607 |
| 5,216,189 | 6/1993 | Kato | 84/662 |

FOREIGN PATENT DOCUMENTS

| | | |
|---|---|---|
| 2-108318 | 4/1990 | Japan . |
| 3-1198 | 1/1991 | Japan . |
| 3-69000 | 3/1991 | Japan . |
| 3-204216 | 9/1991 | Japan . |

*Primary Examiner*—Parshotam S. Lall
*Assistant Examiner*—Viet Vu
*Attorney, Agent, or Firm*—Graham & James LLP

[57] ABSTRACT

A digital signal processing for, e.g., tone synthesis or tone control is performed by reading a microprogram from a microprogram memory and executing a digital signal processing algorithm according to this microprogram using necessary coefficients. A first coefficient to be used in this digital signal processing is supplied by a coefficient supply section but this first coefficient is not used directly for execution of the algorithm. A second coefficient which is actually used is generated as a result of a predetermined interpolation operation by a coefficient interpolation section using the first coefficient as a target value. The second coefficient which is used for execution of the algorithm, therefore, changes timewise toward the first coefficient. This coefficient interpolation section is provided independently from the microprogram. Accordingly, the coefficient can be timewise changed and a timewise changing digital signal processing can thereby be realized without imposing undue burden on an external processor or the internal microprogram.

22 Claims, 7 Drawing Sheets

| INTERPOLATION RATE REGISTER | | | | | |
|---|---|---|---|---|---|
| Bit5 | Bit4 | Bit3 | Bit2 | Bit1 | Bit0 |
| −48 dB (1/256) | −24 dB (1/16) | −12 dB (1/4) | −6 dB (1/2) | −3 dB ($1/2^{1/2}$) | −1.5 dB ($1/2^{1/4}$) |

MSB LSB

FIG. 3

| MUITIPLI. COEFFI. CONVERSION TABLE | | | | | |
|---|---|---|---|---|---|
| RATE COEFFI. IRR2 Bit1, Bit0 | | MULTIPLI. COEFFI. M Bit3, Bit2, Bit1, Bit0 | | | |
| 0 | 0 | 1 | 0 | 0 | 0 |
| 0 | 1 | 0 | 1 | 1 | 1 |
| 1 | 0 | 0 | 1 | 1 | 0 |
| 1 | 1 | 0 | 1 | 0 | 1 |

FIG. 4

| DITHER BIT MASK CONVERSION TABLE | | | | | | | | |
|---|---|---|---|---|---|---|---|---|
| RATE COEFFI. IRR4 Bit5, Bit4, Bit3, Bit2 | | | | BIT MASK SIGNAL Bm Bit20~Bit0 | | | | |
| 0 | 0 | 0 | 0 | 0000 | 0000 | 0000 | 0001 | 1111 |
| 0 | 0 | 0 | 1 | 0000 | 0000 | 0000 | 0011 | 1111 |
| 0 | 0 | 1 | 0 | 0000 | 0000 | 0000 | 0111 | 1111 |
| 0 | 0 | 1 | 1 | 0000 | 0000 | 0000 | 1111 | 1111 |
| 0 | 1 | 0 | 0 | 0000 | 0000 | 0001 | 1111 | 1111 |
| ⋮ | ⋮ | ⋮ | ⋮ | ⋮ | ⋮ | ⋮ | ⋮ | ⋮ |
| 1 | 1 | 0 | 1 | 0011 | 1111 | 1111 | 1111 | 1111 |
| 1 | 1 | 1 | 0 | 0111 | 1111 | 1111 | 1111 | 1111 |
| 1 | 1 | 1 | 1 | 1111 | 1111 | 1111 | 1111 | 1111 |

FIG. 5

| Dv=0001H, IRR=000100B, M=1000B | | | | | | | |
|---|---|---|---|---|---|---|---|
| Dv | 0 | 0000 | 0000 | 0000 | 0001 | | |
| Dm | 00 | 0000 | 0000 | 0000 | 0000 | 1000 | |
| Da | 00 | 0000 | 0000 | 0000 | 00XX | XXXX | |
| D56 | 00 | 0000 | 0000 | 0000 | 0011 | 1000 | 8/64 |
| D57 | 00 | 0000 | 0000 | 0000 | 0011 | 1001 | |
| D58 | 00 | 0000 | 0000 | 0000 | 0011 | 1010 | |
| ⋮ | ⋮ | ⋮ | ⋮ | ⋮ | ⋮ | ⋮ | |
| D63 | 00 | 0000 | 0000 | 0000 | 0011 | 1111 | |
| Df | 00 | 0000 | 0000 | 0000 | 0YX | | |
| IRR4 | | | | | | 0001 | |
| Di | 00 | 0000 | 0000 | 0000 | 00Y | | |

FIG. 6

| Dv=0001H, IRR=000101B, M=0111B | | | | | | | |
|---|---|---|---|---|---|---|---|
| Dv | 0 | 0000 | 0000 | 0000 | 0001 | | |
| Dm | 00 | 0000 | 0000 | 0000 | 0000 | 0111 | |
| Da | 00 | 0000 | 0000 | 0000 | 00XX | XXXX | |
| D57 | 00 | 0000 | 0000 | 0000 | 0011 | 1001 | 7/64 |
| D58 | 00 | 0000 | 0000 | 0000 | 0011 | 1010 | |
| D59 | 00 | 0000 | 0000 | 0000 | 0011 | 1011 | |
| ⋮ | ⋮ | ⋮ | ⋮ | ⋮ | ⋮ | ⋮ | |
| D63 | 00 | 0000 | 0000 | 0000 | 0011 | 1111 | |
| Df | 00 | 0000 | 0000 | 0000 | 0YX | | |
| IRR4 | | | | | | 0001 | |
| Di | 00 | 0000 | 0000 | 0000 | 00Y | | |

FIG. 7

| Dv=0001H, IRR=000110B, M=0110B | | | | | | | |
|---|---|---|---|---|---|---|---|
| Dv | 0 | 0000 | 0000 | 0000 | 0001 | | |
| Dm | 00 | 0000 | 0000 | 0000 | 0000 | 0110 | |
| Da | 00 | 0000 | 0000 | 0000 | 00XX | XXXX | |
| D58 | 00 | 0000 | 0000 | 0000 | 0011 | 1010 | 6/64 |
| D59 | 00 | 0000 | 0000 | 0000 | 0011 | 1011 | |
| D60 | 00 | 0000 | 0000 | 0000 | 0011 | 1100 | |
| ⋮ | ⋮ | ⋮ | ⋮ | ⋮ | ⋮ | ⋮ | |
| D63 | 00 | 0000 | 0000 | 0000 | 0011 | 1111 | |
| Df | 00 | 0000 | 0000 | 0000 | 0YX | | |
| IRR4 | | | | | | 0001 | |
| Di | 00 | 0000 | 0000 | 0000 | 00Y | | |

FIG. 8

| Dv=0001H, IRR=000111B, M=0101B | | | | | | | |
|---|---|---|---|---|---|---|---|
| Dv | 0 | 0000 | 0000 | 0000 | 0001 | | |
| Dm | 00 | 0000 | 0000 | 0000 | 0000 | 0101 | |
| Da | 00 | 0000 | 0000 | 0000 | 00XX | XXXX | |
| D59 | 00 | 0000 | 0000 | 0000 | 0011 | 1011 | 5／64 |
| D60 | 00 | 0000 | 0000 | 0000 | 0011 | 1100 | |
| D61 | 00 | 0000 | 0000 | 0000 | 0011 | 1101 | |
| D62 | 00 | 0000 | 0000 | 0000 | 0011 | 1110 | |
| D63 | 00 | 0000 | 0000 | 0000 | 0011 | 1111 | |
| Df | 00 | 0000 | 0000 | 0000 | 0YX | | |
| IRR4 | | | | | | 0001 | |
| Di | 00 | 0000 | 0000 | 0000 | 00Y | | |

FIG. 9

| Dv=7FFFH, IRR=011000B, M=1000B | | | | | | | |
|---|---|---|---|---|---|---|---|
| Dv | 0 | 0111 | 1111 | 1111 | 1111 | | |
| Dm | 00 | 0011 | 1111 | 1111 | 1111 | 1000 | |
| Da | 00 | 0000 | 0000 | 0XXX | XXXX | XXXX | |
| D08 | 00 | 0000 | 0000 | 0000 | 0000 | 1000 | 2040/2048 |
| D09 | 00 | 0000 | 0000 | 0000 | 0000 | 1001 | |
| D10 | 00 | 0000 | 0000 | 0000 | 0000 | 1010 | |
| ⋮ | ⋮ | ⋮ | ⋮ | ⋮ | ⋮ | ⋮ | |
| D2047 | 00 | 0000 | 0000 | 0111 | 1111 | 1111 | |
| Df | 00 | 0YXX | XXXX | XXXX | XXX | | |
| IRR4 | | | | | | 0110 | |
| Di | 00 | 0000 | 000Y | XXXX | XXX | | |

FIG. 10

| Dv=10001H, IRR=011000B, M=1000B | | | | | | | |
|---|---|---|---|---|---|---|---|
| Dv | 1 | 0000 | 0000 | 0000 | 0001 | | |
| Dm | 11 | 1000 | 0000 | 0000 | 0000 | 1000 | |
| Da | 00 | 0000 | 0000 | 0XXX | XXXX | XXXX | |
| D2040 | 00 | 0000 | 0000 | 0111 | 1111 | 1000 | 8/2048 |
| D2041 | 00 | 0000 | 0000 | 0111 | 1111 | 1001 | |
| D2042 | 00 | 0000 | 0000 | 0111 | 1111 | 1010 | |
| ⋮ | ⋮ | ⋮ | ⋮ | ⋮ | ⋮ | ⋮ | |
| D2047 | 00 | 0000 | 0000 | 0111 | 1111 | 1111 | |
| Df | 11 | 1000 | 0000 | YXXX | XXX | | |
| IRR4 | | | | | | 0110 | |
| Di | 11 | 1111 | 1110 | 0000 | 00Y | | |

FIG. 11

| Dv=0001H, IRR=000000B, M=1000B | | | | | | | |
|---|---|---|---|---|---|---|---|
| Dv | 0 | 0000 | 0000 | 0000 | 0001 | | |
| Dm | 00 | 0000 | 0000 | 0000 | 0000 | 1000 | |
| Da | 00 | 0000 | 0000 | 0000 | 000X | XXXX | |
| D24 | 00 | 0000 | 0000 | 0000 | 0001 | 1000 | 8/32 |
| D25 | 00 | 0000 | 0000 | 0000 | 0001 | 1001 | |
| D26 | 00 | 0000 | 0000 | 0000 | 0001 | 1010 | |
| ⋮ | ⋮ | ⋮ | ⋮ | ⋮ | ⋮ | ⋮ | |
| D31 | 00 | 0000 | 0000 | 0000 | 0001 | 1111 | |
| Df | 00 | 0000 | 0000 | 0000 | 00Y | | |
| IRR4 | | | | | | 0000 | |
| Di | 00 | 0000 | 0000 | 0000 | 00Y | | |

FIG. 12

| Dv=0001H, IRR=000000B, M=1000B | | | | | | | |
|---|---|---|---|---|---|---|---|
| Dv | 0 | 0000 | 0000 | 0000 | 0001 | | |
| Dm | | 0000 | 0000 | 0000 | 0000 | 1000 | |
| Da | | 0000 | 0000 | 0000 | 0000 | 0XXX | |
| D00 | | 0000 | 0000 | 0000 | 0000 | 0000 | 8/8 |
| D01 | | 0000 | 0000 | 0000 | 0000 | 0001 | |
| D02 | | 0000 | 0000 | 0000 | 0000 | 0010 | |
| ⋮ | | ⋮ | ⋮ | ⋮ | ⋮ | ⋮ | |
| D07 | | 0000 | 0000 | 0000 | 0000 | 0111 | |
| Df | | 0000 | 0000 | 0000 | 0000 | 1 | |
| IRR4 | | | | | | 0000 | |
| Di | | 0000 | 0000 | 0000 | 0000 | 1 | |

FIG. 13

| Dv=0001H, IRR=000001B, M=0111B | | | | | | | |
|---|---|---|---|---|---|---|---|
| Dv | 0 | 0000 | 0000 | 0000 | 0001 | | |
| Dm | | 0000 | 0000 | 0000 | 0000 | 0111 | |
| Da | | 0000 | 0000 | 0000 | 0000 | 0XXX | |
| D01 | | 0000 | 0000 | 0000 | 0000 | 0001 | 7/8 |
| D02 | | 0000 | 0000 | 0000 | 0000 | 0010 | |
| D03 | | 0000 | 0000 | 0000 | 0000 | 0011 | |
| ⋮ | | ⋮ | ⋮ | ⋮ | ⋮ | ⋮ | |
| D07 | | 0000 | 0000 | 0000 | 0000 | 0111 | |
| Df | | 0000 | 0000 | 0000 | 0000 | Y | |
| IRR4 | | | | | | 0000 | |
| Di | | 0000 | 0000 | 0000 | 0000 | Y | |

FIG. 14

| Dv=0001H, IRR=000011B, M=0101B | | | | | | | |
|---|---|---|---|---|---|---|---|
| Dv | 0 | 0000 | 0000 | 0000 | 0001 | | |
| Dm | | 0000 | 0000 | 0000 | 0000 | 0101 | |
| Da | | 0000 | 0000 | 0000 | 0000 | 0XXX | |
| D03 | | 0000 | 0000 | 0000 | 0000 | 0011 | 5/8 |
| D04 | | 0000 | 0000 | 0000 | 0000 | 0100 | |
| D05 | | 0000 | 0000 | 0000 | 0000 | 0101 | |
| D06 | | 0000 | 0000 | 0000 | 0000 | 0110 | |
| D07 | | 0000 | 0000 | 0000 | 0000 | 0111 | |
| Df | | 0000 | 0000 | 0000 | 0000 | Y | |
| IRR4 | | | | | | 0000 | |
| Di | | 0000 | 0000 | 0000 | 0000 | Y | |

FIG. 15

| Dv=0001H, IRR=000100B, M=1000B | | | | | | | |
|---|---|---|---|---|---|---|---|
| Dv | 0 | 0000 | 0000 | 0000 | 0001 | | |
| Dm | | 0000 | 0000 | 0000 | 0000 | 1000 | |
| Da | | 0000 | 0000 | 0000 | 0000 | XXXX | |
| D08 | | 0000 | 0000 | 0000 | 0000 | 1000 | 8/16 |
| D09 | | 0000 | 0000 | 0000 | 0000 | 1001 | |
| D10 | | 0000 | 0000 | 0000 | 0000 | 1010 | |
| ⋮ | | ⋮ | ⋮ | ⋮ | ⋮ | ⋮ | |
| D15 | | 0000 | 0000 | 0000 | 0000 | 1111 | |
| Df | | 0000 | 0000 | 0000 | 000Y | X | |
| IRR4 | | | | | | 0000 | |
| Di | | 0000 | 0000 | 0000 | 0000 | Y | |

FIG. 16

| Dv=0001H, IRR=001000B, M=1000B | | | | | | | |
|---|---|---|---|---|---|---|---|
| Dv | 0 | 0000 | 0000 | 0000 | 0001 | | |
| Dm | | 0000 | 0000 | 0000 | 0000 | 1000 | |
| Da | | 0000 | 0000 | 0000 | 000X | XXXX | |
| D24 | | 0000 | 0000 | 0000 | 0001 | 1000 | 8/32 |
| D25 | | 0000 | 0000 | 0000 | 0001 | 1001 | |
| D26 | | 0000 | 0000 | 0000 | 0001 | 1010 | |
| ⋮ | | ⋮ | ⋮ | ⋮ | ⋮ | ⋮ | |
| D31 | | 0000 | 0000 | 0000 | 0001 | 1111 | |
| Df | | 0000 | 0000 | 0000 | 00YX | X | |
| IRR4 | | | | | | 0010 | |
| Di | | 0000 | 0000 | 0000 | 0000 | Y | |

FIG. 17

DIGITAL SIGNAL PROCESSOR INTEGRALLY INCORPORATING A COEFFICIENT INTERPOLATOR STRUCTURED ON A HARDWARE BASIS

This is a continuation of application Ser. No. 07/908,223 filed on Jul. 2, 1992.

BACKGROUND OF THE INVENTION

This invention relates to a digital signal processor suitable for digitalizing and processing a tone signal, voice signal etc., and, more particularly, to a digital signal processor capable of using timewise variable coefficients with a very simple construction.

A digital signal processor (abbreviated as DSP) is used in the field of audio devices for a reverberator, equalizer and mixer and also for constructing digital filters such as an infinite impulse response filter (abbreviated as IIR) and finite impulse filter (abbreviated as FIR). A digital signal processor is used also as a tone source, envelope generator, a reverberation effect device etc. of an electronic musical instrument. A digital signal processor is used also in various other fields including precision control, a high quality television and a video tape recorder.

The quality of an electronic musical instrument has remarkably improved with rapid developments of electronics and digital techniques. It was often pointed out that in the past a tone produced by an electronic musical instrument was inferior in its tone color to that produced by a natural musical instrument. It may be said that the an electronic musical instrument today has already overcome this defect and still is in the process of further development. Particularly, due to appearance of a digital signal processor (DSP) and increase in its processing speed, an electronic musical instrument has come to achieve performance rich in expression and become capable of synthesizing a colorful musical tone.

A DSP generally includes a microprogram register storing a microprogram which constitutes a basic algorithm, a multiplier for executing multiplication and addition at a high speed, an accumulator, a shift register, a data RAM and a coefficient register for supplying predetermined coefficients to the multiplier and other components.

In a case where this DSP is used as a digital filter, tone source, envelope generator or reverberator, contents of the microprogram in the microprogram register and contents of coefficients in the coefficient register must be set to contents adapted to the required function. If characteristics of the DSP adapted to such specific function are to be changed with time, the coefficients need to be changed sequentially with time.

Rewriting of a microprogram and coefficients which determine the function of a DSP has conventionally been made by an external high-positioned processor in structural hierarchy of an electronic musical instrument. As to an interpolation processing for smoothly changing a coefficient, there is prior art on DSP in which a microprogram itself performs such an interpoltion operation on a software basis. More specifically, the microprogram internally incorporated in the DSP has a program for interpolatedly modifying its coefficient, so that the modification of the coefficient is made inside the DSP according to the microprogram itself.

In a case where a DSP is used for a precision machine control with its coefficients being set semi-fixedly, no problem may arise even if such interpolated modification of the coefficients is executed by a microprogram incorporated in the DSP. In a case where a DSP is used for a digital filter for a voice signal etc., however, its filter characteristics must be gradually changed with time and, for this purpose, its coefficients must be changed with time as may be necessary. In a case where a DSP is used as a tone source of an electronic musical instrument also, its coefficients must be momently changed in real time as time elapses.

In cases where coefficients used in a DSP are to be timewise changed, interpolatedly modifying the coefficients by an external processor as in the conventional technique imposes a heavy burden on processing of the external processor with resulting adverse effects on processing by the external processor. On the other hand, interpolatedly modifying coefficients by a microprogram in a DSP requires an area for several tens of steps as an interpolation processing program which causes the microprogram to become so large that a microprogram register will no longer be able to store a program for a digital filter or tone source. Even if the microprogram register can store the interpolation operation program, the microprogram of extremely increased contents tends to deteriorate the high speed processing of the DSP.

SUMMARY OF THE INVENTION

It is, therefore, an object of the invention to provide a digital signal processor capable of performing interpolation operation on coefficients without imposing a burden on an external processor or a microprogram.

For achieving this object, a digital signal processor according to the invention comprises microprogram memory means for storing a microprogram including a signal processing algorithm, reading means for reading out said microprogram stored in said memory means, supply means for supplying a first coefficient to be used as a target value, interpolation means for performing interpolation operation on an initial value and said target value on the basis of an interpolation algorithm and producing an interpolated coefficient whose value timewise approaches a value of said first coefficient, the supply means and the interpolation means being structured on a hardware basis and signal processing means for performing a digital signal processing under control of said signal processing algorithm by using said interpolated coefficient and producing a processed signal.

According to the invention, the signal processing means executes a digital signal processing corresponding to the algorithm defined by the microprogram by not using the first coefficient supplied by the supply means but by using the interpolated coefficient generated by the interpolation means. The interpolation means performs a predetermined interpolation operation on the initial value and the first coefficient as a target value and, as a result of the interpolation operation, produces the interpolated coefficient which timewise approaches a value of the first coefficient. Accordingly, a timewise variable digital signal processing can be performed in accordance with the timewise change of the interpolated coefficient without changing the signal processing algorithm which is determined by the microprogram. In this case, the first coefficient used as a target value in the interpolation means need not change. An external processor or a microprogram, therefore, only has to offer the first coefficient used as a target value in the interpolation means and need not perform the interpolation operation processing by itself as in the conventional device, so that the burden imposed on the external processor and microprogram can be reduced.

Preferred embodiments of the invention will be described below with reference to the accompanying drawings.

BRIEF DESCRIPTION OF THE DRAWINGS

In the accompanying drawings,

FIG. 3 is a diagram showing an example of an interpolation rate register of FIG. 2;

FIG. 4 is a diagram showing an example of contents of a multiplication coefficient conversion table realized by a multiplication coefficient conversion circuit of FIG. 2;

FIG. 5 is a diagram showing contents of a dither bit mask conversion table realized by a bit mask generator of FIG. 2;

FIG. 6 is a diagram showing states of digital signals at respective parts of a coefficient interpolation section of FIG. 2 when difference data Dv is "0001H" and interpolation rate coefficient IRR is "0001100B";

FIG. 7 is a diagram showing states of digital signals at respective parts of the coefficient interpolation section of FIG. 2 when difference data Dv is "0001H" and interpolation rate coefficient IRR is "000101B";

FIG. 8 is a diagram showing states of digital signals at respective parts of the coefficient interpolation section of FIG. 2 when difference data Dv is "0001H" and interpolation rate coefficient IRR is "000110B";

FIG. 9 is a diagram showing states of digital signals at respective parts of the coefficient interpolation section of FIG. 2 when difference data Dv is "0001H" and interpolation rate coefficient IRR is "000111B";

FIG. 10 is a diagram showing states of digital signals at respective parts of the coefficient interpolation section of FIG. 2 when difference data Dv is "7FFFH" and interpolation rate coefficient IRR is "011000B";

FIG. 11 is a diagram showing states of digital signals at respective parts of the coefficient interpolation section of FIG. 2 when difference data Dv is "10001H" and interpolation rate coefficient IRR is "011000B";

FIG. 12 is a diagram showing states of digital signals at respective parts of the coefficient interpolation section of FIG. 2 when difference data Dv is "0001H" and interpolation rate coefficient IRR is "000000B";

FIG. 13 is a diagram showing states of digital signals at respective parts of the coefficient interpolation section of another embodiment when difference data Dv is "0001H" and interpolation rate coefficient IRR is "000000B";

FIG. 14 is a diagram showing states of digital signals at respective parts of the coefficient interpolation section of the other embodiment when difference data Dv is "0001H" and interpolation rate coefficient IRR is "000000B";

FIG. 15 is a diagram showing states of digital signals at respective parts of the coefficient interpolation section of the other embodiment when difference data Dv is "0001H" and interpolation rate coefficient IRR is "000011B";

FIG. 16 is a diagram showing states of digital signals at respective parts of the coefficient interpolation section of the other embodiment when difference data Dv is "0001H" and interpolation rate coefficient IRR is "000100B"; and FIG. 17 is a diagram showing states of digital signals at respective parts of the coefficient interpolation section of the other embodiment when difference data Dv is "0001H" and interpolation rate coefficient IRR is "001000B".

DESCRIPTION OF THE PREFERRED EMBODIMENTS

Figure 1:
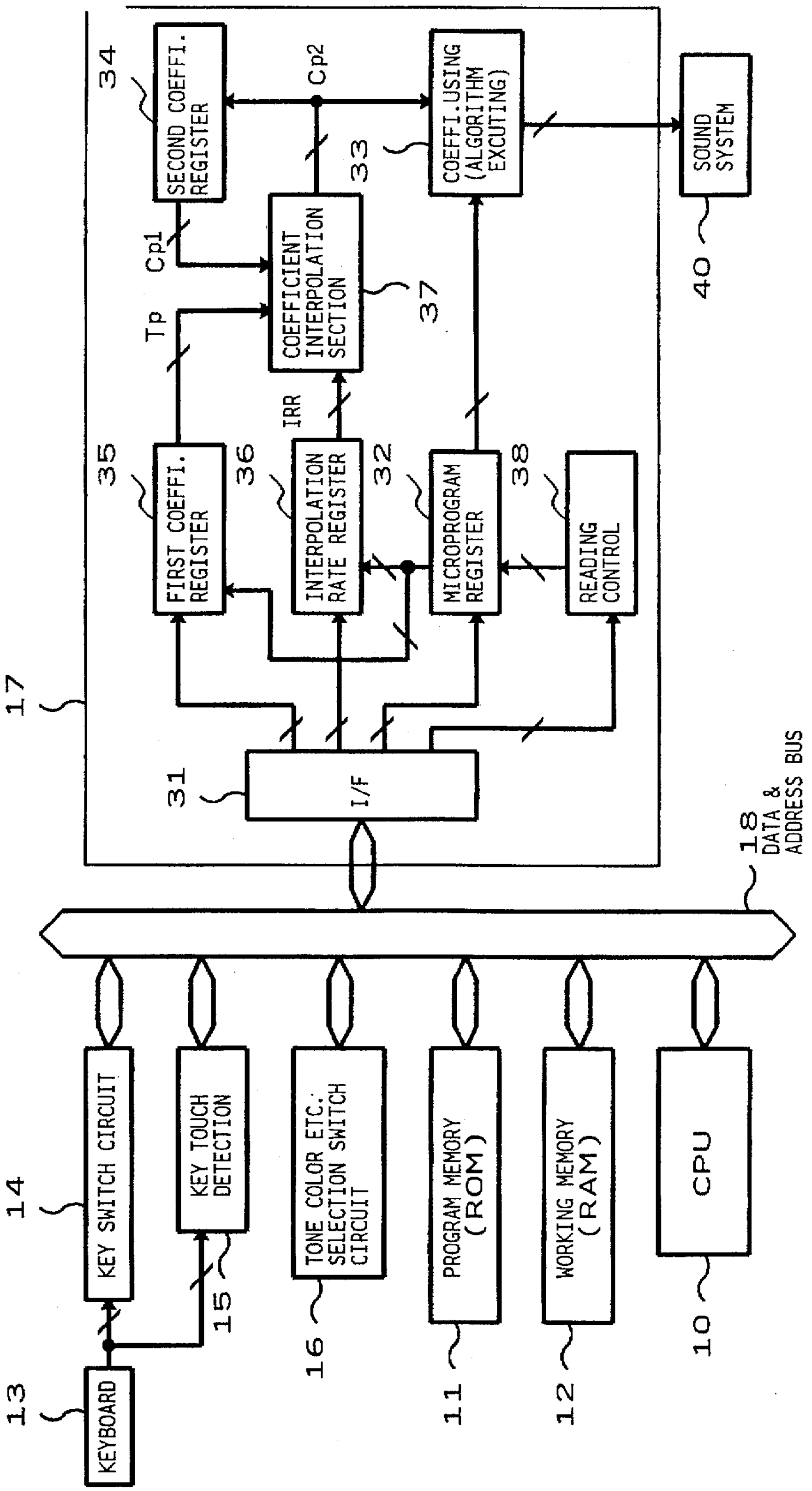
FIG. 1 is a block diagram showing a hardware construction of an embodiment of an electronic musical instrument in which the digital signal processor according to the invention is used as a tone source.

FIG. 1 is a block diagram showing a hardware construction of an embodiment of an electronic musical instrument using a digital signal processor of the invention as a tone source. In this embodiment, controls of the entire tone synthesis device are performed by a microcomputer system including a microprocessor unit (CPU) 10, a program memory (ROM) 11 storing a system program and various parameters and a working RAM 12 used as a working area for temporarily storing various data.

In the embodiment of FIG. 1, controls of the entire electronic musical instrument is performed by a microcomputer system including the microprocessor unit (COU) 10, the program memory (ROM) 11 storing a system program and the working memory (RAM) 12 storing various data.

To the microcomputer system are connected, through a data and address bus 18, various circuits including a key switch circuit 14, a key touch detection circuit 15, a tone color ETC. selection circuit 16 and a tone source 17. These circuits are controlled by the microcomputer.

A keyboard 13 includes plural keys for selecting tone pitches of tones to be generated and to the keyboard circuit 13 are connected the key switch circuit 14 and the key touch detection circuit 15 for respective keys of the keyboard 13.

The key switch circuit 14 consists of plural key switches provided for respective keys in the keyboard which designate tone pitches of tones to be generated. The key switch circuit 14 detects a key depression or key release state of the keyboard 13, outputs a key-on event signal KON in response to change from a released key state to a depressed key state, outputs a key-off event signal KOF in response to change from a depressed key state to a released key state, and also outputs a key code signal KC representing a key corresponding to each key event. Responsive to these respective outputs of the key switch circuit 14, the microcomputer performs a depressed key detection processing and a key assignment processing for assigning a depressed key to any of plural tone generation channels. If necessary, a processing for detecting a key depression speed during depression of a key and thereby generating initial touch data ITD is also performed.

The key touch detection circuit 15 includes an after touch sensor which, in association with each key of the keyboard 13, detects the pressing force applied onto the key during depression of the key and produces after touch data ATD.

The tone color ETC. selection switch circuit 16 is provided in an operation panel including operators for selecting, setting and controlling tone color, tone volume, tone pitch and effects. This circuit 16 acts to select one of tone colors of natural musical instruments such as piano, organ, violin, brass instruments and guitar and other tone colors and provide a tone color selection signal.

The tone source 17 capable of generating tone signals simultaneously in plural tone generation channels receives the key code KC, key-on signal KON, key-off signal KOF, initial touch data ITD, after touch data ATD, tone color selection signal TC and other data of a key assigned to each channel through the data and address bus 18 and generates a tone signal on the basis of these data.

A digital tone signal generated from the tone source 17 is converted to an analog tone signal by a digital-to-analog converter (not shown) in a sound system 40. The sound system 40 includes a loudspeaker and an amplifier and generates a tone corresponding to the digital tone signal from the tone source 17.

In this embodiment, the tone source 17 is constructed of a digital signal processor (DSP). In the following description, the tone source 17 will be referred to as "tone source DSP 17". This tone source DSP 17 therefore performs all processings relating to synthesis and control of digital tone signals (e.g., tone signal generation, tone color control, tone volume control and effect imparting). The tone source DSP 17 includes an interface 31, a microprogram register 32, a coefficient using section (algorithm execution section) 33, a second coefficient register 34, a first coefficient register 35, an interpolation rate register 36, a coefficient interpolation section 37 and a microprogram reading control section 38. The interface 31, microprogram register 32 and coefficient using section 33 are of the same hardware construction as a conventional DSP.

The interface 31 is an interface for exchanging data between the microprocessor system and the tone source DSP 17. The microprogram register 32 is a register for storing a microprogram for the tone source and is constructed of, e.g., a RAM. The microprogram is written by the external CPU 10 through the data and address bus 18 and the interface 31. Control for reading the microprogram stored in the register 32 is performed in a known manner by the microprogram reading control section 38. The coefficient using section 33 executes the algorithm for a digital signal processing defined by the read out microprogram by utilizing coefficients and includes a multiplier, accumulator, shift register, data RAM and random number generator for performing a high speed multiplication and addition. The construction of the coefficient using section 33 is the same as a conventional one, and so further description thereof will be omitted.

The tone source DSP 17 of this embodiment includes coefficient interpolation means including a second coefficient register 34, first coefficient register 35, interpolation rate register 36 and coefficient interpolation section 37 for supplying a predetermined coefficient to the coefficient using section.

The second coefficient register 34 is connected to the coefficient interpolation section 37 and stores a coefficient Cp2 which the coefficient interpolation section 37 is currently supplying to the coefficient using section 33 and feeds back this coefficient to the coefficient interpolation section 37 as a current coefficient Cp1.

The first coefficient register 35 is connected to the interface 31 and the coefficient interpolation section 37 and stores a target coefficient Tp which is to be finally supplied to the coefficient using section 33 and supplies this target coefficient Tp to the coefficient interpolation section 37. This target coefficient Tp is written by the external CPU 10 through the data and address bus 18 and the interface 31.

The interpolation rate register 36 is connected to the interface 31 and the coefficient interpolation section 37 and stores an interpolation rate coefficient IRR for determining the interpolation rate of the coefficient interpolation section 37 and supplies this interpolation rate coefficient IRR to the coefficient interpolation section 37. This interpolation rate coefficient IRR is written by the external CPU 10 through the data and address bus 18 and the interface 31. The construction of this interpolation rate register 36 is shown in FIG. 3. In FIG. 3, the interpolation rate coefficient is of a 6-bit construction. The amount of attenuation of each bit is −48 dB for Bit 5, −24 dB for Bit 4, −12 dB for Bit 3, −3 dB for Bit 1 and −1.5 dB for Bit 0 in the order from MSB to LSB.

During one cycle of the microprogram consisting of plural steps, signal processings of different types concerning the tone synthesis and tone control are performed. Therefore, the first coefficient register 35 and the interpolation rate register 36 store target coefficient Tp and interpolation rate coefficient IRR necessary for performing the object signal processings in correspondence to the step of the microprogram stored in the microprogram register 32. Accordingly, the target coefficient Tp and interpolation rate coefficient IRR are read out from the first coefficient register 35 and the interpolation rate register 36 at each step of the microprogram register 32 and supplied to the coefficient interpolation section 37. The target coefficient Tp and the interpolation rate coefficient IRR need not necessarily be of a different value for each step.

The coefficient interpolation section 37 is connected to the coefficient using section 33, second coefficient register 34 and first coefficient register 35 and performs a control for increasing or decreasing the current coefficient Cp1 in the second coefficient register 34 so that the current coefficient Cp1 becomes equal to the target coefficient Tp in the first coefficient register 35 and sequentially supplies the coefficient Cp2 present at that time to the coefficient using section 33. The coefficient interpolation section 37 is connected to the interpolation rate register 36 and changes the interpolation rate in accordance with the interpolation rate coefficient IRR from the interpolation rate register 36.

Figure 2:
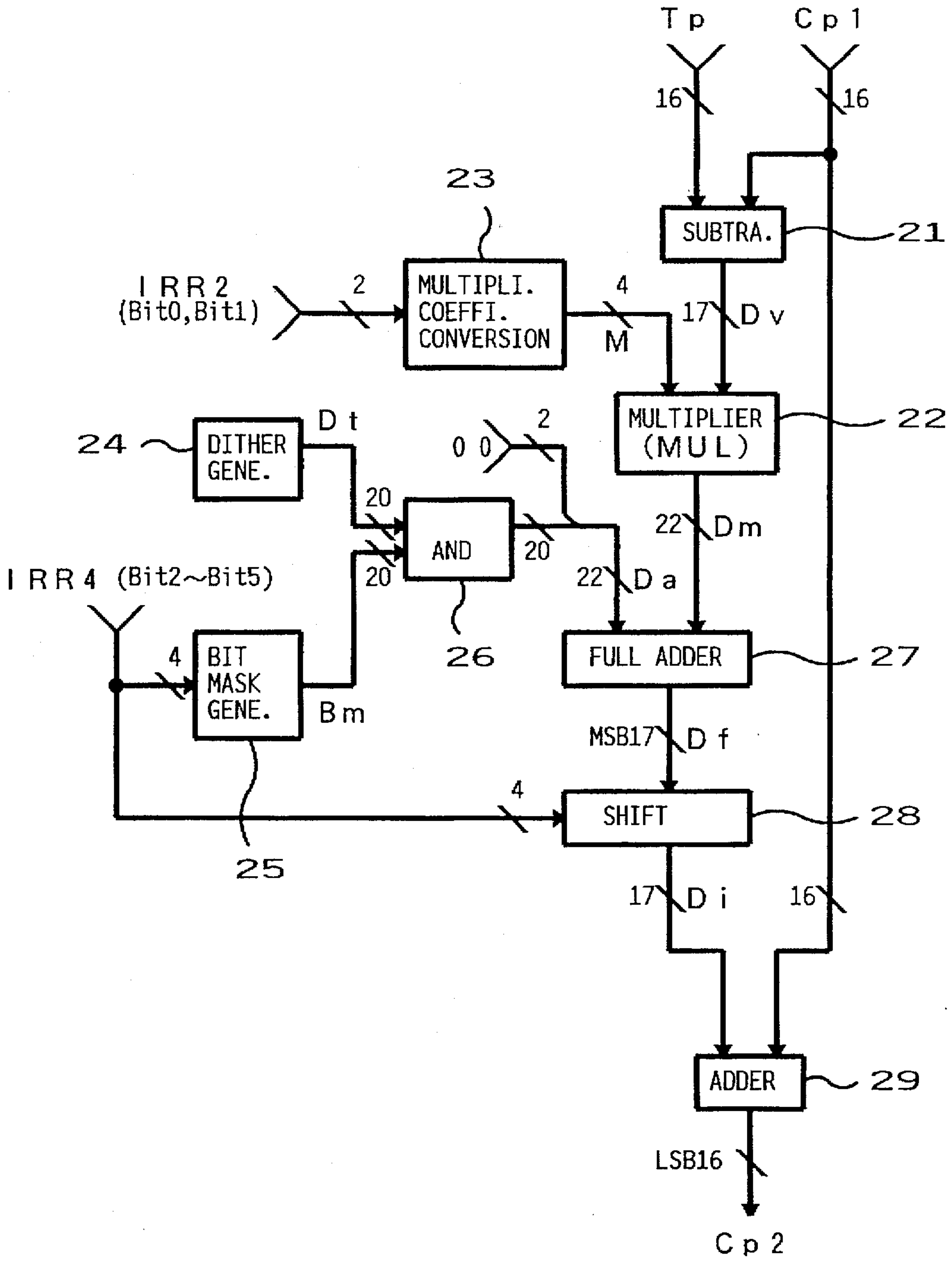
FIG. 2 is a block diagram showing a specific example of a coefficient interpolation section of FIG. 1.

FIG. 2 shows an example of a specific construction of the coefficient interpolation section 37.

This coefficient interpolation section 37 is basically constructed of a multiplication circuit. By way of example, description will be made about a case where the coefficient Cp2 supplied from the coefficient interpolation section 37 to the coefficient using section 33 is of a 16-bit (i.e., 2's complement) construction and the interpolation rate coefficient IRR supplied from the intrepolation rate register 36 to the coefficient interpolation section 37 is of a 6-bit construction.

A subtractor 21 is connected to the second coefficient register 34, first coefficient register 35 and multiplier 22 and subtracts the current coefficient Cp1 (16 bits) of the second coefficient register 34 from the target coefficient Tp (16 bits) of the first coefficient register 35, produces difference data Dv of 17 bits by affixing a sign to the result of subtraction and supplies this difference data Dv to the multiplier (MUL) 22.

A multiplication coefficient conversion circuit 23 is connected to the interpolation rate register 36 and the multiplier 22 and receives low order 2 bits (Bit0 and Bit1) of the 6-bit interpolation rate coefficient IRR stored in the interpolation rate register 36 as interpolation rate coefficient IRR2, converts this coefficient to a multiplication coefficient M of 4-bit construction in accordance with a multiplication coefficient conversion table of FIG. 4 and supplies it to the multiplier 22.

In FIG. 4, the interpolation rate coefficient IRR2 is of 2-bit construction, the total number of the multiplication coefficient M is 4. When the interpolation rate coefficient IRR2 is "00B" (B representing binary notation), the multiplication coefficient M is "1000B", when the interpolation rate coefficient IRR2 is "01B", the multiplication coefficient M is "0111B", when the interpolation coefficient IRR2 is "10B", the multiplication coefficient M is "0110B" and when the interpolation rate coefficient IRR2 is "11B", the multiplication coefficient M is "0101B".

The multiplier 22 is connected to the multiplication coefficient conversion circuit 23, the subtractor 21 and a full adder 27. It multiplies the 17-bit difference data Dv from the subtractor 21 with the 4-bit multiplication coefficient M from the multiplication coefficient conversion circuit 23 and supplies the result of addition to the full adder 27 as 22-bit product data Dm.

When the interpolation rate coefficient IRR is "00B", the multiplier 22 multiplies the difference data Dv by 8 times, i.e., shifts the difference data Dv by 3 bits leftwardly. When the interpolation rate coefficient IRR2 is "01B", the multiplier 22 multiplies the difference data Dv by 7 times, when the interpolation rate coefficient IRR2 is "10B", the multiplier 22 multiplies the difference data Dv by 6 times and when the interpolation rate coefficient IRR2 is "11B", the multiplier 22 multiplies the difference data Dv by 5 times and supplies the multiplied data to the full adder 27 as the 22-bit product data Dm. If the multiplier 22 had only to multiply the difference data Dv by 8 times, 20-bit data (17 bits plus 3 bits) would suffice as the product data Dm. Since, however, the leftward processing by 2 bits is made in the next processing in the full adder 27, the product data Dm is constructed of 22 bits. Accordingly, 5 bits are truncated or discarded from the output of the full adder 27.

The 22-bit product data Dm obtained in the multiplier 22 may be directly shifted rightwardly by a shift circuit 28 to provide 17-bit interpolation amount data Di. As the current coefficient Cp1 approaches the target coefficient Tp, the difference data Dv is decreased and a shifting error will be produced by the right shifting with a result that the interpolation amount data Di becomes zero notwithstanding that the difference data Dv is not zero and thus the current coefficient Cp1 never reaches the target coefficient Tp.

In this embodiment, therefore, for reducing the shifting error occurring in the rightward shifting of the interpolation amount data Di to the 17-bit data, three are provided a dither generator 24, a bit mask generator 25, an AND gate 26 and a full adder 27.

The dither generator 24 is a circuit generating a kind of noise signal (dither signal) called dither used for whitening a quantizing noise. A dither signal Dt is of a 20-bit construction and is applied to the AND gate 26. A part of the interpolation parameter is changed randomly by this dither signal.

The bit mask generator 25 is connected to an interpolation rate register 36 and the AND gate 26. This generator 25 receives high order 4 bits (Bit2–Bit5) of the 6-bit interpolation rate coefficient IRR stored in the interpolation rate register 36 as an interpolation rate coefficient IRR4, converts it to a bit mask signal Bm (Bit20–Bit0) of a 20-bit construction in accordance with a dither bit mask conversion table of FIG. 5, and supplies this signal to the AND gate 26.

In FIG. 5, the interpolation rate coefficient IRR4 is of a 4-bit construction and, therefore, there are 16 bit mask signals Bm corresponding to the interpolation rate coefficient IRR4. When the interpolation rate coefficient IRR4 is "0000B", the bit mask signal Bm is "0000 0000 0000 0001 1111B". When the interpolation rate coefficient IRR4 is "0001B", the bit mask signal Bm is "0000 0000 0000 0011 1111B". When the interpolation rate coefficient IRR4 is "0010B", the bit mask signal Bm is "0000 0000 0000 0111 1111B". In this manner, as the interpolation rate coefficient IRR4 increases, the number of high order bit which is masked gradually decreases.

The AND gate 26 receives the dither signal Dt from the dither generator 24 and the bit mask signal Bm from the bit mask generator 25, and it provides a logical product signal of the two signals to the full adder 27. Since the logical product signal provided by the AND gate 26 at this time is of a 20-bit construction, a bit signal "00B" (Bit21 and Bit22) is added to the high order bit side of the 20-bit logical product signal in the route between the AND gate 26 and the full adder 27 for causing the logical product signal to coincide with the 22-bit construction of the product data Dm. Accordingly, the full adder 27 receives a carry signal Da of a 22-bit construction.

The full adder 27 which is connected to the multiplier 22, AND gate 26 and shift circuit 28, adds the 22-bit product Dm from the multiplier 22 and the 22-bit carry signal Da (including the added 2 bits) from the AND gate 26 and supplies 17 high order bits (including the sign bit) of the result of the addition to the shift circuit 28 as sum data Df. In other words, the full adder 27 truncates the 3 bits which has been leftward shifted by the multiplication by the multiplier 22 and the 2 bits which has been leftward shifted by the carry signal Da from the AND gate 26 (5 bits of the bit mask—3 bits of the multiplier).

The shift circuit 28 which is connected to the interpolation register 36, full adder 27 and adder 29, shifts the sum data Df from the full adder 27 rightward in accordance with the value designated by the interpolation rate coefficient IRR4 and supplies the result of shifting to the adder 29 as the interpolation amount data Di (17-bit construction including a sign bit).

The adder 29 which is connected to the shift circuit 28, the second coefficient register 29 and the coefficient using section 33, adds the interpolation amount data Di from the shift circuit 28 and the current coefficient Cp1 (16-bit construction) from the second coefficient register 34 together having regard to the sign and feeds back the result of addition (16-bit construction) to the second coefficient register 34 as new current coefficient Cp2 and also supplies it to the coefficient using section 33.

FIGS. 6–11 illustrate states of digital signals in the respective parts of the coefficient interpolation section 37 of FIG. 2 for describing the operation thereof.

FIGS. 6–9 illustrate states of interpolation amount data Di in a case where the interpolation rate coefficient IRR has changed from "000100B" to "000111B" when the difference data Dv which is the result of subtracting the current coefficient Cp1 of the second coefficient register 34 from the target coefficient Tp of the first coefficient register 35 is "0001H" (H representing a hexadecimal notation). FIGS. 10 and 11 illustrate states of the interpolation amount data Di in a case where the difference data Dv is "7FFFH" and "10001H" when the interpolation coefficient IRR of the interpolation rate register 36 is "011000B".

FIG. 6 illustrates values of digital signals at the respective parts when the difference data Dv is "0001H" and the interpolation rate coefficient IRR is "000100B". In this figure, the binary notation of the difference data Dv is "0 0000 0000 0000 0001B". The "0" of MSB of this binary notation represents that this difference data Dv is a positive value. The value "000H" of the difference data Dv represents a difference between the current coefficient Cp1 and the target coefficient Tp which is the minimum value which can be processed by this coefficient interpolation section 37.

Since the interpolation rate coefficient IRR2 is "00B", the multiplication coefficient M becomes "1000B" in accordance with the multiplication coefficient conversion table of FIG. 4. The difference data Dv is multiplied with this multiplication coefficient M. Therefore, as a result of the multiplication, the product data Dm becomes "00 0000 0000 0000 0000 1000B". This data corresponds to data obtained by shifting the difference data Dv "0 0000 0000 0000 0001" leftward by 3 bits.

Since the interpolation rate coefficient IRR4 is "0001B", the bit mask generator 25 generates the bit mask signal Bm of "0000 0000 0000 0011 1111B" in accordance with the dither bit mask conversion table of FIG. 5 and supplies this signal Bm to the AND gate 26. High order 14 bits of the dither signal Dt provided by the dither generator 24 are masked by the bit mask signal Bm and, therefore, 6 low order bits of the dither signal Dt only pass the AND gate 26 and the carry signal Da of "00 0000 0000 0000 00XX, XXXXB" is applied to the full adder 27. "X" in the carry signal Da represents the value of the dither signal Dt which is either "0" or "1". That is, this carry signal Da is one of 64 states from "00 0000 0000 0000 0000 0000B" to "00 0000 0000 0011 1111B" and this signal is applied to the full adder 27 and added therein to the product data Dm.

The sum data Df provided by the full adder 27 is the result of addition of the product data Dm "00 0000 0000 0000 0000 1000B" and the carry signal Da "00 0000 0000 0000 00XX XXXXB" and becomes "00 0000 0000 0000 0YXX XXXXB". The "Y" in the sum data Df is a value which becomes "1" when there is a carry as a result of the addition and "0" when there is no carry. Accordingly, in the case of 8 carry signals D56 "00 0000 0000 0000 0011 1000B"–D63 "00 0000 0000 0000 0011 1111B", "Y" of the sum data Df becomes "1" and otherwise becomes "1". In other words, "Y" of the sum data Df becomes "1" at the probability of 8/64.

The full adder 27 supplies 17 high order bits of the sum data resulting from the addition of the product data Dm and the carry signal Da to the shift circuit 28 as sum data Df (00 0000 0000 0000 0YX).

The shift circuit 28 supplies to the adder 29 interpolation amount data Di "00 0000 0000 0000 00Y" resulting from shifting the sum data Df rightward by one bit on the basis of the interpolation rate coefficient IRR4 "0001B". The adder 29 adds this interpolation amount data Di and the current coefficient data Cp1 together having regard to its sign and thereby provides new current coefficient data Cp2.

FIG. 7 illustrates states of digital signals at the respective parts when the difference data Df is "0001H" and the interpolation rate coefficient IRR is "000101B". Since the interpolation rate coefficient IRR2 is "01B", the multiplication coefficient M becomes "0111B" in accordance with the multiplication coefficient conversion table of FIG. 4. The difference data Dv is multiplied with this multiplication coefficient M and the product data Dm thereby becomes "00 0000 0000 0000 0000 0111B".

Since the interpolation rate coefficient IRR4 is "0001B", the carry signal Da is "00 0000 0000 0000 00XX XXXXB" which is the same as in FIG. 6. The sum data Df provided by the full adder 27 is a value resulting from the addition of the product data Dm "00 0000 0000 0000 0000 0111B" and the carry signal Da "00 0000 0000 0000 00XX XXXXB" which is the same as in FIG. 6.

However, "Y" of the sum data Df can become "1" only when the carry signal Da is one of 7 carry signals D57 "00 0000 0000 0000 0011 1001B"–D63 "00 0000 0000 0000 0011 1111B" as shown in FIG. 7 and otherwise "Y" becomes "00. Thus, in the case of FIG. 7, "Y" of the sum data Df becomes "1" at the probability of 7/64 and, therefore, the probability of carry is decreased as compared with the case of FIG. 6. In the subsequent operation, the full adder 27, shift circuit 28 and adder 29 operate in the same manner as in FIG. 6 and the adder 29 produces new current data Cp2.

FIG. 8 illustrates states of digital signals at the respective parts when the difference data Dv is "0001H" and the interpolation rate coefficient IRR is "000110B". Since interpolation rate coefficient IRR2 is "10B", the multiplication coefficient M becomes "0110B" in accordance with the multiplication coefficient conversion table of FIG. 4. The difference value Dv is multiplied with this multiplication coefficient M and the product data Dm thereby becomes "00 0000 0000 0000 0000 0110B".

Since the interpolation rate coefficient IRR4 is "0001B", the carry signal Da is "100 0000 0000 0000 00XX XXXXB" which is the same as in FIG. 6. The sum data Df provided by the full adder 27 is a value resulting from the addition of the product data Dm "00 0000 0000 0000 0000 0110B" and the carry signal Da "00 0000 0000 0000 00XX XXXXB" and becomes "00 0000 0000 0000 0YXX XXXXB" which is the same as in FIG. 6.

Since "Y" of the sum data Df can become "1" only when the carry signal Da is one of 6 carry signals D58 "00 0000 0000 0000 0011 1010B"–D63 "00 0000 0000 0000 0011 1111B" as shown in FIG. 8 and otherwise "Y" is "0". Thus, in the case of FIG. 8, "Y" of the sum data Df becomes "1" at the probability of 6/64 and, therefore, the probability of carry is further decreased as compared with the cases of FIGS. 6 and 7. In the subsequent operation, the full adder 27, shift circuit 28 and adder 29 operate in the same manner as in the case of FIG. 6 and the adder 29 produces new current data Cp2.

FIG. 9 illustrates states of digital signals at the respective parts when the difference data Dv is "0001H" and th interpolation rate coefficient IRR is "000111B". Since the interpolation rate coefficient IRR2 is "11B", the multiplication coefficient M becomes "0101B" in accordance with the multiplication coefficient conversion table of FIG. 4. The difference data Dv is multiplied with this multiplication coefficient M and the product data Dm thereby becomes "00 0000 0000 0000 0000 0101B".

Since the interpolation rate coefficient IRR4 is "0001B", the carry signal Da is "00 0000 0000 0000 00XX XXXXB" which is the same as in FIG. 6. The sum data Df provided by the full adder 27 is a value resulting from the addition of the product data Dm "00 0000 0000 0000 0000 0101B" and the carry signal Da "00 0000 0000 0000 00XX XXXXB" and becomes "00 0000 0000 0000 0YXX XXXXB" which is the same as in FIG. 6.

Since "Y" of the sum data Df can become "1" only when the carry signal Da is one of 5 carry signals D59 "00 0000 0000 0000 0011 1010B"–D63 "00 0000 0000 0000 0011B" as shown in FIG. 9 and otherwise "Y" is "0". Thus, in the case of FIG. 9, "Y" of the sum data Df becomes "1" at the probability of 5/64 and, therefore, the probability of carry further decreases as compared with the cases of FIGS. 6, 7 and 8. In the subsequent 29 operation, the full adder 27, shift circuit 28 and adder 29 operate in the same manner as in FIG. 6 and the adder 29 produces new current data Cp2.

As shown in FIGS. 6–9, even when the difference data Dv is the same, the probability that "Y" of the sum data Df becomes "1" gradually decreases as the interpolation rate coefficient IRR (amount of attenuation) increases. In other words, the difference in the interpolation rate by the interpolation rate coefficient IRR is filled as a matter of probability.

FIG. 10 illustrates states of digital signals at the respective parts when the difference data Dv is "7FFFH" and the interpolation rate coefficient IRR is "011000B". In the binary notation, the difference data Dv is "0 0111 1111 1111 1111B". The "0" of MSB of this binary notation represents that the difference data Dv is a positive value.

Since the interpolation rate coefficient IRR2 is "00B", the multiplication coefficient M becomes "1000B" in accordance with the multiplication coefficient conversion table of FIG. 4. The difference data Dv is multiplied with this multiplication coefficient M and the product data Dm becomes "00 0011 1111 1111 1111 1000B".

Since the interpolation rate coefficient IRR4 is "0110B", the bit mask generator 25 generates the bit mask signal Bm "0000 0000 0111 1111 1111B" in accordance with the dither bit mask conversion table of FIG. 5 and supplies this signal Bm to the AND gate 26. Higher order 9 bits of the dither signal Dt provided by the dither generator 24 are masked by the bit mask signal Bm and, therefore, 11 low order bits only of the dither signal Dt pass the AND gate 26 and the carry signal Da "00 0000 0000 0XXX XXXXB" is applied to the full adder 27. The carry signal Da therefore is one of 2048 states from "00 0000 0000 0000 0000 0000B" to "00 0000 0000 0111 1111 1111B".

The sum data Df provided by the full adder 27 is a value resulting from the addition of the product data Dm "00 0011 1111 1111 1111 1111B" and the carry signal Da 100 0000 0000 0XXX XXXX XXXXB" and becomes "00 0YXX XXXX XXXX XXXX XXXXB". "Y" of the sum data Df becomes "1" when there is a carry as a result of the addition and "0" when there is no carry. When, therefore, the carry signal Da is one of 2040 carry signals D08 "00 0000 0000 0000 0000 1000B"–D2047 "00 0000 0000 0111 1111 1111B", "Y" of the sum data Df becomes "1" and otherwise it becomes "0". Therefore, "Y" of the sum data Df becomes "1" at the probability of 2040/2048.

The full adder 27 supplies to the shift circuit 28 17 high order bits of the sum data resulting from the addition of the product data Dm and the carry signal Da as sum data Df "00 0YXX XXXX XXXX XXXB".

The shift circuit 28 supplies, on the basis of the interpolation rate coefficient IRR4 "0110B", the interpolation amount data Di "00 0000 000Y XXXX XXXXB" obtained by sifting the sum data Df by 6 bits to the adder 29. The adder 29 adds this interpolation amount data Di and the current data Cp1 together having regard to its sign and provides new current data Cp2.

FIG. 11 illustrates states of digital signals at the respective parts when the difference data Dv is "10001H" and the interpolation rate coefficient IRR is "011000B". In the figure, the binary notation of the difference data Dv is "1 0000 0000 0000 001B". The "1" of MSB of this binary notation represents that this difference data Dv is a negative value.

Since the interpolation rate coefficient IRR2 is "00B", the multiplication coefficient M becomes "1000B" in accordance with the multiplication coefficient conversion table of FIG. 4. The difference data Dv is multiplied with this multiplication coefficient M and the product data Dm thereby becomes "11 1000 0000 0000 0000 1000B".

Since the interpolation rate coefficient IRR4 is "0110B", the bit mask generator 25 supplies the carry signal Da "00000 0000 0XXX XXXXB" to the full adder 27. Therefore, the carry signal Da is one of 2048 states from "00 0000 0000 0000 0000 0000B" to "00 0000 0000 0111 1111 1111B".

The sum data Df provided by the full adder 27 is a value resulting from the addition of the product data Dm "11 1000 0000 0000 0000 1000B" and the carry signal Da "00 0000 0000 0XXX XXXX XXXXB" and becomes "11 1000 0000 YXXX XXXX XXXXB". "Y" of the sum data Df is "1" when there is a carry as a result of the addition and "0" when there is no carry. Therefore, when the carry signal Da is one of 8 carry signals D2040 "00 0000 0000 0111 1111 1000B"–D2047 "00 0000 0000 0111 1111 1111B" as shown in FIG. 6, "Y" of the sum data Df becomes "1" and otherwise is "0". Therefore, "Y" of the sum data Df becomes "1" at the probability of 8/2048. Since, however, the difference data Dv is a negative value in this case, the probability that "Y" of the sum data Df does not become "1" is more important and this probability is 2020/2048 which is the same as in the case of FIG. 10.

The full adder 27 supplies 17 high order bits of the sum data of the product data Dm and the carry signal Da to the shift circuit 28 as the sum data Df "11 1000 0000 YXXX XXXB".

The shift circuit 28 shifts, on the basis of the interpolation rate coefficient IRR4 "0110B", the sum data Df by 6 bits ot obtain the interpolation amount data Di "11 1111 1110 0000 00YB" and supplies this data Di to the adder 29. The adder 29 adds this interpolation amount data Di and the current data Cp1 together having regard to its sign and provides new current data Cp2.

As described in the foregoing, according to the above described embodiment, the carry processing is performed on the basis of a dither signal and, therefore, the interpolation rate is maintained in terms of probability whereby the coefficient can be caused to reach the target value.

In the above described embodiment, even when the interpolation rate coefficient IRR is "000000B", data "0000 0000 0000 0001 11111B" is generated as the bit mask signal Bm and the full adder 27 truncates 5 low order bits from the result of addition (sum data Df) of the product data Dm and the carry signal Da and supplies the remaining data to the shift circuit 28. Since the data is shifted rightward by 2 bits unconditionally, the probability of carry is smaller than 1 notwithstanding that the interpolation rate coefficient IRR is "000000B", i.e., the attenuation amount is 0 dB. For this reason, the probability that the interpolation amount data Di "0 0000 0000 0000 0001" is supplied to the adder 29 becomes 8/32. This state will be described more fully with reference to FIG. 12.

FIG. 12 illustrates states of digital signals at the respective parts when the difference data Dv is "00001H" and the interpolation rate coefficient IRR is "000000B". In the figure, the binary notation of the difference data Dv is "0 0000 0000 0000 0001B". The "0" of MSB of this binary notation represents that the difference data Dv is a positive value.

Since the interpolation rate coefficient IRR2 is "00B", the multiplication coefficient M becomes "1000B" in accordance with the multiplication coefficient conversion table of FIG. 4. The difference data Dv is multiplied with this multiplication coefficient M and the product data Dm becomes "00 0000 0000 0000 0000 000B". This corresponds to data resulting from shifting the difference data Dv "0 0000 0000 0000 0001B" leftward by 3 bits.

Since the interpolation rate coefficient IRR4 is "0000B", the bit mask generator 25 generates the bit mask signal Bm "0000 0000 0000 0001 1111B" in accordance with the dither bit mask conversion table of FIG. 5 and supplies this signal Bm to the AND gate 26. High order 15 bits of the dither signal Dt provided by the dither generator 24 are masked by the bit mask signal Bm and, therefore, 5 low order bits only of the dither signal Dt pass the AND gate 26 and the carry signal Da "00 0000 0000 0000 000X XXXXB" is applied to the full adder 27. The carry signal Da therefore is one of 32 states from "1100 0000 0000 0000 0000 0000B" to "00 0000

0000 0000 0001 1111B". This data is applied to the full adder 27 and added to the product data Dm.

The sum data Df provided by the full adder 27 is a value resulting from the addition of the product data Dm "00 0000 0000 0000 0000 1000B" and the carry signal Da "100 0000 0000 0000 000X XXXXB" and becomes "00 0000 0000 0000 00YX XXXXB". "Y" of the sum data Df becomes "1" when there is a carry as a result of the addition and "0" when there is no carry. When, therefore, the carry signal Da is one of 8 carry signals D24 "00 0000 0000 0000 0011 0000B"–D31 "00 0000 0000 0000 0011 1111B", "Y" of the sum data Df becomes "1" and otherwise it becomes "0". Therefore, "Y" of the sum data Df becomes "1" at the probability of 8/32.

The full adder 27 supplies to the shift circuit 28 17 high order bits of the sum data resulting from the addition of the product data Dm and the carry signal Da as sum data Df "00 0000 0000 0000 00Y".

Since the interpolation rate coefficient IRR4 is "0000B", the shift circuit 28 supplies the interpolation amount data Di "00 0000 0000 0000 00Y" to the adder 29 without performing the right shifting. The adder 29 adds this interpolation amount data Di and the current data Cp1 together having regard to its sign and provides new current data Cp2.

When the interpolation rate coefficient IRR is "000000B", the attenuation amount is 0 dB and, accordingly, it is desirable that the difference data Dv "0 0000 0000 0000 0001" is supplied directly to the adder 29 as the interpolation amount data Di. In the above described embodiment, however, the interpolation processing depending upon probability is performed even in a case where dispersed coefficients (i.e., coefficients without interpolation) are to be supplied to the coefficient using section 33.

Therefore, the coefficient interpolation section 37 is modified in the following manner.

The multiplier 22 supplies product data Dm of a 20-bit construction to the full adder 27. The bit mask generator 25 reduces the mask bit number of the bit mask signal Bm by 2 bits. That is, when the interpolation rate coefficient IRR4 is "0000B", the bit mask generator 25 supplies "0000 0000 0000 0000 0111" as the bit mask signal Bm to the AND gate 26. The AND gate 26 supplies a 20-bit carry signal Da directly to the full adder 27 without performing addition of bits. The full adder 27 supplies 17 high order bits and truncates 3 low order bits.

By modifying the coefficient interpolation section 37 in this manner, when the interpolation rate coefficient IRR is "000000B", the difference data Dv is supplied directly to the adder 29 as the interpolation amount data Di and, therefore, when dispersed coefficients (coefficients without interpolation) are to be supplied to the coefficient using section 33, this will be achieved by setting the interpolation rate coefficient IRR to "000000B".

FIGS. 13–17 illustrate states of digital signals in the respective parts for describing the operation of the coefficient using section 37 modified in the above described manner.

FIGS. 13–17 illustrate states of the interpolation amount data Di in a case where the interpolation rate coefficient IRR of the interpolation rate register 36 has changed from "000000B" to "001000B" when the difference data Dv resulting from subtracting the current coefficient Cp1 of the second coefficient register 34 from the target coefficient Tp of the first coefficient register 35 is "0001H".

FIG. 13 illustrates states of digital signals at the respective parts when the difference data Dv is "000H" and the interpolation rate coefficient IRR is "000000B" (the attenuation amount 0 dB). In the figure, the binary notation of the difference data Dv is "0 0000 0000 0000 0001B". Since the interpolation rate coefficient IRR2 is "00B", the multiplication coefficient M becomes "1000B" in accordance with the multiplication coefficient conversion table of FIG. 4. The difference data Dv is multiplied with this multiplication coefficient M. As a result of the multiplication, the product data Dm becomes "0000 0000 0000 0000 1000B" (20-bit construction). This corresponds to data resulting from shifting the difference data Dv "0 0000 0000 0000 0001B" leftward by 3 bits.

Since the interpolation rate coefficient IRR4 is "0000B", the bit mask generator 25 generates the bit mask signal Bm "10000 0000 0000 0000 0111B" in accordance with the dither bit mask conversion table of FIG. 5 and supplies this signal Bm to the AND gate 26. High order 17 bits of the dither signal Dt provided by the dither generator 24 are masked by the bit mask signal Bm and, therefore, 3 low order bits only of the dither signal Dt pass the AND gate 26 and the carry signal Da "0000 0000 0000 0000 0XXXB" is applied to the full adder 27. The carry signal Da therefore is one of 8 states from "0000 0000 0000 0000 0000B" to "10000 0000 0000 0000 0111B". This data is applied to the full adder 27 and added to the product data Dm.

The sum data Df provided by the full adder 27 is a value resulting from the addition of the product data Dm "1100 0000 0000 0000 0000 1000B" and the carry signal Da "100 0000 0000 0000 0000 0XXXB" and becomes "00 0000 0000 0000 0000 1XXXB". Accordingly, whichever one of 8 carry signals D00 "0000 0000 0000 0000 1000B"–D07 "0000 0000 0000 01111B" shown in FIG. 6 the carry signal Da may be, the sum data Df becomes "10000 0000 0000 0000 1XXXB".

The full adder 27 supplies to the shift circuit 28 17 high order bits of the sum data resulting from the addition of the product data Dm and the carry signal Da as sum data Df "0000 0000 0000 0000 1". Since the interpolation rate coefficient IRR4 is "0000B", the shift circuit 28 supplies the interpolation amount data Di "0000 0000 0000 0000 1" to the adder 29 without performing the right shifting of the sum data Df. In other words, when the interpolation rate coefficient IRR is "000000B", the attenuation amount is 0 dB, so that the value of the difference data Dv is supplied directly to the adder 29 as the interpolation amount data di.

FIG. 14 illustrates states of digital signals at the respective parts when the difference data Df is "0001H" and the interpolation rate coefficient IRR is "00000B". Since the interpolation rate coefficient IRR2 is "01B", the multiplication coefficient M becomes "0111B" in accordance with the multiplication coefficient conversion table of FIG. 4. The difference data Dv is multiplied with this multiplication coefficient M and, as a result of the multiplication, the product data Dm thereby becomes "10000 0000 0000 0000 011B".

Since the interpolation rate coefficient IRR4 is "0000B", the carry signal Da is "0000 0000 0000 0000 0XXX" which is the same as in FIG. 13. The sum data Df provided by the full adder 27 is a value resulting from the addition of the product data Dm "0000 0000 0000 0000 0111B" and the carry signal Da "0000 0000 0000 0000 0XXXB" and becomes "0000 0000 0000 0000 YXXXB".

However, "Y" of the sum data Df can become "1" only when the carry signal Da is one of 7 carry signals D01 "0000 0000 0000 0000 0001B"–D07 "0000 0000 0000 0000 0111B" as shown in FIG. 14 and otherwise "Y" becomes "0". Thus, in the case of FIG. 14, "Y" of the sum data Df becomes "1" at the probability of 7/8 and, therefore, the probability of carry is decreased as compared with the case of FIG. 13.

FIG. 15 illustrates states of digital signals at the respective parts when the difference data Df is "0001H" and the interpolation rate coefficient IRR is "000011B". Since the interpolation rate coefficient IRR2 is "11B", the multiplication coefficient M becomes "0111B" in accordance with the multiplication coefficient conversion table of FIG. 4. The difference data Dv is multiplied with this multiplication coefficient M and, as a result of the multiplication, the product data Dm thereby becomes "0000 0000 0000 0000 0101B".

Since the interpolation rate coefficient IRR4 is "0000B", the carry signal Da is "10000 0000 0000 0000 0XXX" which is the same as in FIG. 13. The sum data Df provided by the full adder 27 is a value resulting from the addition of the product data Dm "0000 0000 0000 0000 0101B" and the carry signal Da "0000 0000 0000 0000 0XXXB" and becomes "0000 0000 0000 0000 YXXXB".

However, "Y" of the sum data Df can become "1" only when the carry signal Da is one of 5 carry signals D03 "0000 0000 0000 0000 0011B"–D07 "0000 0000 0000 0000 0111B" as shown in FIG. 14 and otherwise "Y" becomes "0". Thus, in the case of FIG. 15, "Y" of the sum data Df becomes "1" at the probability of 5/8 and, therefore, the probability of carry is decreased as compared with the cases of FIGS. 13 and 14.

FIG. 16 illustrates states of digital signals at the respective parts when the difference data Df is "0000H" and the interpolation rate coefficient IRR is "000100B". Since the interpolation rate coefficient IRR2 is "00B", the multiplication coefficient M becomes "1000B" in accordance with the multiplication coefficient conversion table of FIG. 4. The difference data Dv is multiplied with this multiplication coefficient M and, as a result of the multiplication, the product data Dm thereby becomes "0000 0000 0000 0000 1000B".

Since the interpolation rate coefficient IRR4 is "0001B", the carry signal Da is "0000 0000 0000 0000 XXXX". The sum data Df provided by the full adder 27 is a value resulting from the addition of the product data Dm "0000 0000 0000 0000 1000B" and the carry signal Da "10000 0000 0000 0000 XXXXB" and becomes "0000 0000 0000 0000 XXXXB".

However, "Y" of the sum data Df can become "1" only when the carry signal Da is one of 8 carry signals D81 "0000 0000 0000 0000 1000B"–D15 "0000 0000 0000 0000 1111B" as shown in FIG. 16 and otherwise "Y" becomes "0". Thus, in the case of FIG. 16, "Y" of the sum data Df becomes "1" at the probability of 8/16 and, therefore, the probability of carry is decreased further as compared with the cases of FIGS. 13, 14 and 15.

FIG. 17 illustrates states of digital signals at the respective parts when the difference data Df is "0001H" and the interpolation rate coefficient IRR is "010001B". Since the interpolation rate coefficient IRR2 is "00B", the multiplication coefficient M becomes "1000B" in accordance with the multiplication coefficient conversion table of FIG. 4. The difference data Dv is multiplied with this multiplication coefficient M and, as a result of the multiplication, the product data Dm thereby becomes "0000 0000 0000 0000 1000B".

Since the interpolation rate coefficient IRR4 is "0110B", the carry signal Da is "0000 0000 0000 000X XXXX". The sum data Df provided by the full adder 27 is a value resulting from the addition of the product data Dm "0000 0000 0000 0000 1000B" and the carry signal Da "10000 0000 0000 000X XXXXB" and becomes "0000 0000 0000 00YX XXXXB".

However, "Y" of the sum data Df can become "1" only when the carry signal Da is one of 8 carry signals D24 "0000 0000 0000 0001 1000B"–D31 "0000 0000 0000 0001 1111B" as shown in FIG. 17 and otherwise "Y" becomes "0". Thus, in the case of FIG. 17, "Y" of the sum data Df becomes "1" at the probability of 8/32 and, therefore, the probability of carry is decreased further as compared with the cases of FIGS. 13, 14, 15 and 16.

As has been shown in FIGS. 13–17, in a case where the value "0001H" of the difference data Dv is a minimum value which can be dealt with by the coefficient interpolation section 37, the difference data Dv is supplied to the adder 29 directly as the interpolation amount data Di when the interpolation rate coefficient IRR is "000000B". The difference data Dv is supplied directly to the adder 29 as the interpolation amount data Di at probability of 7/8 when the interpolation rate coefficient IRR is "000001B", at probability of 6/8 when the interpolation rate coefficient IRR is "000010B", at probability of 5/8 when the interpolation rate coefficient IRR is "000011B", at probability of 8/16 (=4/8) when the interpolation rate coefficient IRR is "000100", and at probability of 8/32 (=2/8) when the interpolation rate coefficient IRR is "001000". Thus, the magnitude of the interpolation rate coefficient is maintained in terms of probability.

Accordingly, in a case where dispersed coefficients (coefficients without interpolation) are to be supplied to the coefficient using section 37, this can be achieved by setting the interpolation rate coefficient to "000000B".

In the above described embodiment, the tone source DSP17 has the interpolation rate coefficient IRR at each step of the microprogram. Alternatively, an interpolation rate selection register may be provided at each step of the microprogram and the interpolation rate coefficient IRR may be read from an interpolation rate memory which is provided separately for addresses of the interpolation rate selection register. By this arrangement, the necessity for setting numerous interpolation rate coefficients in one microprogram and, by rewriting values in the interpolation rate memory properly, the interpolation rate coefficients corresponding to all steps of the microprogram using it can be changed all at once.

In the above described embodiment, the coefficient Cp2 of the coefficient interpolation section 37 is supplied to the coefficient using section 33 and the first coefficient register 34. Alternatively, the coefficient Cp2 of the coefficient interpolation section 37 may be stored in the first coefficient register 34 and the current coefficient Cp1 of the first coefficient register 34 may be supplied to the coefficient using section 33. In the above embodiment, the interpolation rate register 36 and the first coefficient register 35 are rewritten by an external processor through the interface 31. Alternatively, the coefficient using section 33 itself may be rewritten by a microprogram.

In the above described embodiment, the invention is applied to the tone source DSP of an electronic musical instrument. Application of the invention however is not limited to this but the invention is applicable also to digital signal processors used in various fields including those for audio devices, digital filters, an envelope generation circuit in an electronic musical instrument, precision control devices, high quality televisions and digital video tape recorders.

As described above, according to the invention, sequential change with time of a coefficient used in a digital signal processor can be achieved without imposing burden on an external processor or a microprogram.

What is claimed is:

1. A digital signal processor of an integrated circuit architecture comprising:

microprogram memory means for storing a microprogram including a plurality of program steps defining a signal processing algorithm relating to at least one of synthesis and control of a digital sound signal;

reading means for reading out the program steps of said microprogram stored in said memory means;

coefficient supply means for supplying a first coefficient to be used as a target value, said first coefficient being supplied for each of the read out program steps;

interpolation rate supply means for supplying rate data representative of an interpolation rate for each of the read out program steps;

interpolation means for performing an interpolation operation, in correspondence with each of said plurality of program steps, between an initial value and said target value on the basis of an interpolation algorithm and producing a time-varying interpolated coefficient having a value which approaches a value of said first coefficient in accordance with said rate data supplied from said interpolation rate supply means, wherein said coefficient supply means, said interpolation rate supply means and said interpolation means are structured on a hardware basis; and signal processing means for receiving step-by-step microprogram data of said signal processing algorithm read out by said reading means from said microprogram memory means and input data to be used for at least one of synthesis and control of said digital sound signal and performing digital signal processing on a step-by-step basis which corresponds to said signal processing algorithm on the basis of the step-by-step microprogram data by use of said interpolated coefficient, thereby producing a digitally processed sound signal.

2. A digital signal processor as defined in claim 1 wherein said interpolation means comprises first operation means for obtaining a difference between said target value and said initial value and second operation means for producing said interpolated coefficient in accordance with said difference.

3. A digital signal processor as defined in claim 2 wherein said interpolation means further comprises third operation means for scaling said difference, said second operation means produces said interpolated coefficient in accordance with said scaled difference.

4. A digital signal processor as defined in claim 3 wherein said interpolation means further comprises random signal generation means for generating a random signal which changes its value at random, and where said third operation means scales said difference in accordance with said random signal.

5. A digital signal processor as defined in claim 3 wherein said third operation means scales said difference in accordance with rate data corresponding to said interpolation rate supplied from said interpolation rate supply means.

6. A digital signal processor as defined in claim 5 wherein said rate data is a value which varies with time.

7. A digital signal processor as defined in claim 5 further comprising:

random signal generation means for generating a dither signal of plural bits which changes its value at random; and wherein:

said third operation means comprises multiplication means for multiplying said difference with the said rate data to produce said scaled difference, and said second operation means includes addition means for adding said dither signal to said scaled difference to produce said interpolated coefficient.

8. A digital signal processor as defined in claim 5 further comprising:

random signal generation means for generating a dither signal of plural bits which changes its value at random, and wherein:

said third operation means comprises shift means for shifting a value corresponding to said difference in accordance with the rate data, and said second operation means includes means for masking a part of bits of said dither signal in accordance with said rate data and using a masked dither signal to produce said interpolated coefficient.

9. A digital signal processor as defined in claim 5 further comprising:

random signal generation means for generating a dither signal of plural bits which changes its value at random; wherein:

said rate data includes first interpolation rate data corresponding to a mantissa section and second interpolation rate data corresponding to an exponent section, said third operation means comprises multiplication means for multiplying the value of the difference with the first interpolation rate data and shift means for shifting input data in accordance with the second interpolation rate data, and said interpolation means further comprises masking means for masking a part of bits of the dither signal in accordance with the value of the interpolation rate data and addition means for adding a masked dither signal to an output signal of the multiplication means and applying the result of addition to said shift means.

10. A digital signal processor as defined in claim 2 wherein said interpolation means further comprises random signal generation means for generating a random signal which changes its value at random, and third operation means for modifying at least one of said difference and said interpolated coefficient in accordance with said random signal.

11. A digital signal processor as defined in claim 1 further comprising random signal generation means for generating a random signal which changes its value at random, said interpolation operation being done based on said random signal.

12. A digital signal processor as defined in claim 11 wherein said random signal is generated at a probability corresponding to said interpolation operation.

13. A digital signal processor as defined in claim 11 wherein said interpolation operation adds said random signal to said interpolated coefficient.

14. A digital signal processor as defined in claim 1 wherein said initial value is renewed in accordance with said interpolated coefficient each time said interpolated coefficient is produced, said interpolation means performing said interpolation operation on said renewed initial value and said target value.

15. A digital signal processor as defined in claim 1 which further comprises rate supply means for supplying rate data determining an interpolation rate of said interpolation operation corresponding to each step of said microprogram, said interpolation means performing said interpolation operation at a rate corresponding to said interpolation rate data.

16. A digital signal processor as defined in claim 15 wherein said rate supply means comprises rate memory means storing said rate data.

17. A digital signal processor as defined in claim 15 wherein said data determining an interpolation rate have plural sets of data, and which further comprises means for selecting one from among said plural sets, said interpolation operation being done based on said selected one.

18. A digital signal processor as defined in claim 1 wherein said microprogram executes different signal processings in one execution cycle consisting of plural steps, said supply means supplies said first coefficient which is proper to each of the different signal processings at each predetermined step, and said interpolation means performs an interpolation operation independently for each of the different signal processings in accordance with an interpolation rate which is supplied independently for each of the different signal processings.

19. A digital signal processor of an integrated circuit architecture for musical tone synthesis and control comprising:

microprogram memory means for storing a microprogram including a plurality of program steps defining a signal processing algorithm for musical tone synthesis and control;

reading means for reading out the program steps of said microprogram stored in said memory means;

coefficient supply means for supplying a first coefficient to be used for a signal processing for tone synthesis and control, said first coefficient being supplied for each of the read out program steps;

interpolation rate supply means for supplying rate data representative of an interpolation rate for each of the read out program steps;

interpolation means for performing an interpolation operation, in correspondence with each of said plurality of program steps, between an initial value and said first coefficient as a target value on the basis of an interpolation algorithm and producing a time-varying interpolated coefficient having a value approaches a value of said first coefficient in accordance with said rate data supplied from said interpolation rate supply means, wherein said coefficient supply means, said interpolation rate supply means and said interpolation means are structured on a hardware basis; and signal processing means for performing a digital signal processing under step-by-step control of said signal processing algorithm by using said interpolated coefficient and producing a musical tone signal.

20. A digital signal processor of an integrated circuit architecture comprising:

microprogram memory means for storing a microprogram including a plurality of program steps defining a signal processing algorithm relating to at least one of synthesis and control of a digital sound signal;

reading means for reading out the program steps of said microprogram stored in said memory means;

coefficient storing means for storing a first coefficient received from an external source and supplying said stored first coefficient as a target value for each of the read out program steps;

rate data storing means for storing data representative of an interpolation rate received from an external source and supplying said stored data for each of the read out program steps;

interpolation means for performing interpolation operation, in correspondence with each of said plurality of program steps, between an initial value and said target value on the basis of an interpolation algorithm and producing a time-varying interpolated coefficient having a value which approaches a value of said first coefficient and varies in accordance with said interpolation rate supplied from said rate-data storing means, wherein said coefficient storing means, said rate data storing means and said interpolation means are structured on a hardware basis; and signal processing means for receiving step-by-step microprogram data of said signal processing algorithm read out by said reading means from said microprogram memory means and input data to be used for at least one of synthesis and control of said digital sound signal and performing digital signal processing on a step-by-step basis which corresponds to said signal processing algorithm on the basis of the step-by-step microprogram data by use of said interpolated coefficient, thereby producing a digitally processed sound signal.

21. A digital signal processor comprising:

microprogram storage means for storing a microprogram including a plurality of program steps defining a signal processing algorithm;

microprogram readout means for reading out the program steps of the microprogram from said storage means;

coefficient supply means for receiving and storing a first coefficient introduced from an external source, said first coefficient being supplied for each of the read out program steps;

interpolation rate supply means for supplying an interpolation rate for each of the read out program steps;

interpolation means for receiving the first coefficient from said coefficient supply means and the interpolation rate from the interpolation supply means, for each of the program steps, and providing an interpolated coefficient value that changes in response to the interpolation rate, using the first coefficient as a target value;

dither processing means for providing a second coefficient by coupling the interpolated coefficient value from said interpolation means to a random signal corresponding to the interpolation rate; and signal processing means for performing an arithmetic operation on a step-by-step basis based on the microprogram and performing digital signal processing in a microprogram step-by-step basis in accordance with the second coefficient provided from said dither processing means.

22. A digital signal processor as defined in claim 21 wherein said rate supplied by the interpolation rate supply means varies in accordance with the microprogram read out from said microprogram storage means.

* * * * *